United States Patent
Mattlar et al.

(10) Patent No.: US 8,926,215 B2
(45) Date of Patent: Jan. 6, 2015

(54) ARRANGEMENT FOR SECURING SWITCH CONTROL SHAFT TO SWITCH PIPE SHAFT

(75) Inventors: Harri Mattlar, Iskmo (FI); Rainer Kolmonen, Laihia (FI); Jarkko Alanen, Ylihärmä (FI)

(73) Assignee: Abb Oy, Helsinki (FI)

( * ) Notice: Subject to any disclaimer, the term of this patent is extended or adjusted under 35 U.S.C. 154(b) by 1979 days.

(21) Appl. No.: 10/586,154

(22) PCT Filed: Jan. 28, 2005

(86) PCT No.: PCT/FI2005/000060
§ 371 (c)(1),
(2), (4) Date: Jun. 26, 2008

(87) PCT Pub. No.: WO2005/073488
PCT Pub. Date: Aug. 11, 2005

(65) Prior Publication Data
US 2008/0247816 A1    Oct. 9, 2008

(30) Foreign Application Priority Data
Jan. 30, 2004    (FI) .................................... 20040137

(51) Int. Cl.
| | |
|---|---|
| F16B 7/10 | (2006.01) |
| E05B 3/04 | (2006.01) |
| F16B 3/00 | (2006.01) |
| F16B 7/04 | (2006.01) |
| F16B 7/14 | (2006.01) |
| F16B 21/10 | (2006.01) |
| F16D 1/08 | (2006.01) |
| F16B 9/02 | (2006.01) |
| H01H 3/32 | (2006.01) |

(52) U.S. Cl.
CPC ... *E05B 3/04* (2013.01); *F16B 3/00* (2013.01); *F16B 7/0413* (2013.01); *F16B 7/14* (2013.01); *F16B 21/10* (2013.01); *F16D 1/087* (2013.01); *F16B 9/023* (2013.01); *H01H 3/32* (2013.01)
USPC ..................................... 403/109.5; 200/61.39

(58) Field of Classification Search
CPC ............ H01H 3/08; H01H 3/10; H01H 19/14
USPC ......................... 403/1, 109.1–109.8; 464/182; 200/61.39
See application file for complete search history.

(56) References Cited

U.S. PATENT DOCUMENTS

| | | | | |
|---|---|---|---|---|
| 2,093,321 | A | * | 9/1937 | Kempton ....................... 403/383 |
| 2,461,135 | A | * | 2/1949 | Bentley ......................... 439/806 |

(Continued)

FOREIGN PATENT DOCUMENTS

| | | |
|---|---|---|
| DE | 1 231 082 | 12/1966 |
| DE | 297 17 668 U1 | 1/1998 |

(Continued)

OTHER PUBLICATIONS

International Search Report dated Jun. 9, 2005.

(Continued)

*Primary Examiner* — Victor MacArthur
(74) *Attorney, Agent, or Firm* — Buchanan Ingersoll & Rooney PC

(57) ABSTRACT

The invention relates to an arrangement for attaching a switch control shaft to a switch pipe shaft, where the control shaft is mounted partly in the switch pipe shaft and tightened to the switch pipe shaft by a screw. The arrangement comprises a tightening piece. The screw is arranged to act on the control shaft through the tightening piece so that when the screw is turned, the tightening piece is arranged to press the control shaft against the pipe shaft so that the control shaft tightens fast between the tightening piece and the pipe shaft.

21 Claims, 1 Drawing Sheet

(56) References Cited

U.S. PATENT DOCUMENTS

| | | | | |
|---|---|---|---|---|
| 2,673,259 | A * | 3/1954 | Appleton et al. | 200/43.13 |
| 2,863,968 | A * | 12/1958 | Trautman | 337/374 |
| 2,953,937 | A * | 9/1960 | Jackson et al. | 74/504 |
| 3,255,641 | A * | 6/1966 | Russell | 74/559 |
| 3,504,939 | A | 4/1970 | Junghanns | |
| 3,571,534 | A * | 3/1971 | Ashman | 200/11 D |
| 3,683,304 | A * | 8/1972 | Freeby | 337/347 |
| 3,690,287 | A * | 9/1972 | Jedynak et al. | 116/281 |
| 3,745,289 | A * | 7/1973 | Hipple | 200/330 |
| 3,806,267 | A * | 4/1974 | Vining, Jr. | 403/362 |
| 3,965,529 | A * | 6/1976 | Hadzimahalis | 16/441 |
| 4,077,696 | A * | 3/1978 | Glaesel | 439/806 |
| 4,175,822 | A * | 11/1979 | Debaigt | 439/625 |
| 4,210,935 | A * | 7/1980 | Mitchell et al. | 348/822 |
| 4,235,323 | A * | 11/1980 | Dykzeul | 192/95 |
| 4,637,412 | A * | 1/1987 | Martinez | 132/323 |
| 5,486,661 | A * | 1/1996 | Jambor et al. | 200/47 |
| 5,954,192 | A * | 9/1999 | Iitsuka | 200/336 |
| 5,998,743 | A * | 12/1999 | Unkel | 200/43.11 |
| 6,225,580 | B1 * | 5/2001 | Lemire | 200/11 DA |
| 7,448,640 | B2 * | 11/2008 | Weaver | 280/507 |
| 7,614,577 | B2 * | 11/2009 | Ochiai et al. | 242/283 |
| 2003/0029429 | A1 * | 2/2003 | Adkins | 124/44.5 |
| 2003/0221510 | A1 * | 12/2003 | Vogt | 74/553 |
| 2008/0302235 | A1 * | 12/2008 | Lauck | 89/132 |

FOREIGN PATENT DOCUMENTS

| | | |
|---|---|---|
| EP | 0 427 885 A1 | 5/1991 |
| GB | 1126499 | 9/1968 |
| GB | 2 256 022 A | 11/1992 |

OTHER PUBLICATIONS

Written Opinion of the International Searching Authority dated Jun. 9, 2005.
Finland Search Report dated Aug. 16, 2004 (with English translation of category of cited documents).

* cited by examiner

ARRANGEMENT FOR SECURING SWITCH CONTROL SHAFT TO SWITCH PIPE SHAFT

BACKGROUND OF THE INVENTION

The invention relates to an arrangement for securing a switch control shaft to a switch pipe shaft, where the control shaft is mounted partly in the switch pipe shaft and tightened to the switch pipe shaft by a screw.

The invention relates to switchboard cabinets which include a control handle arranged in the cabinet door or the like for controlling a switch included in the switchboard cabinet from outside the cabinet and in which a switch control shaft is arranged between the control handle and the switch for transmitting the rotational motion directed at the control handle to the switch and for turning the switch from one operating position to another.

The switch is typically mounted on a baseboard included in the cabinet and the control handle of the switch is installed in the cabinet door at the site of the control mechanism. For the switch control handle to be placeable at a distance from the actual switch, i.e. in the cabinet door so as to enable controlling the switch by the control handle arranged in the door, the control shaft of the above-mentioned switch is arranged between the switch and the control handle.

The switch control shaft is usually a bar with a square cross section, whose one end goes inside the pipe shaft provided in the switch, into a space with a square cross-section, and whose other end extends to a corresponding opening with a square cross section in the control handle installed in the door. When the switch is turned, the control handle pivots around its longitudinal axis, whereby the switch turns into another operating position.

In the installation stage, the control shaft is cut roughly to the correct length and adjusted to its exact length by testing, and finally the control shaft is secured, i.e. locked, to the pipe shaft. The length of the control shaft depends on the distance between the switch and the cabinet door, i.e. the opening for the control handle in the door. Since the switch control handle is installed in the door of the cabinet, the control shaft has to remain secured to the switch when the door is opened. The control shaft should also stay in the same position during the whole time the door is open so as to facilitate the closing of the door and the placing of the control shaft in the opening of the control handle (inside the door).

The control shaft is conventionally secured, i.e. locked, to the pipe shaft by means of screw fastening. In a prior art solution, on the side of the pipe shaft, there is a through threaded hole, through which a locking screw locks the control shaft to the pipe shaft of the switch. The locking screw presses the control shaft against the pipe shaft so that the control shaft locks, i.e. tightens fast between the locking screw and the inner surface of the pipe shaft. The middle axis of the threaded hole and the middle/longitudinal axis of the switch pipe shaft are thus substantially transverse to each other in this prior art solution.

A problem associated with the arrangement described above is that since the adjustment of the control shaft and its locking into position with respect to the pipe shaft are usually performed in a fully-equipped cabinet, it is difficult to access the screw for tightening from the side of the pipe shaft.

BRIEF DESCRIPTION OF THE INVENTION

The object of the invention is to provide an arrangement for securing a switch control shaft to a switch pipe shaft that solves the above-mentioned problems.

The object of the invention is achieved by an arrangement which is characterized by what is disclosed in the independent claim.

Preferred embodiments of the invention are disclosed in the dependent claims.

The invention is based on the idea that it comprises a tightening piece, which enables the removal of a screw from the side of the pipe shaft and the mounting of the screw in a place where it can be tightened easily. According to the invention, the screw acts on the tightening piece, which in turn acts on the control shaft and presses this against the pipe shaft so that the control shaft locks with respect to the pipe shaft, into a desired position between the tightening piece and the inner surface of the pipe shaft.

BRIEF DESCRIPTION OF THE FIGURES

The invention will now be described in greater detail by means of preferred embodiments, with reference to the accompanying drawings, in which.

DETAILED DESCRIPTION OF THE INVENTION

Figure 1:
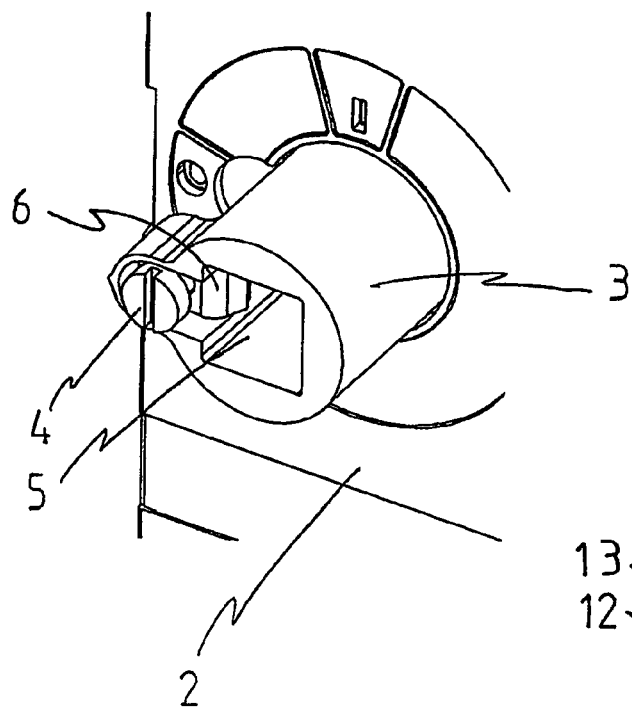
FIG. 1 illustrates a switch pipe shaft and part of the switch.
Figure 2:
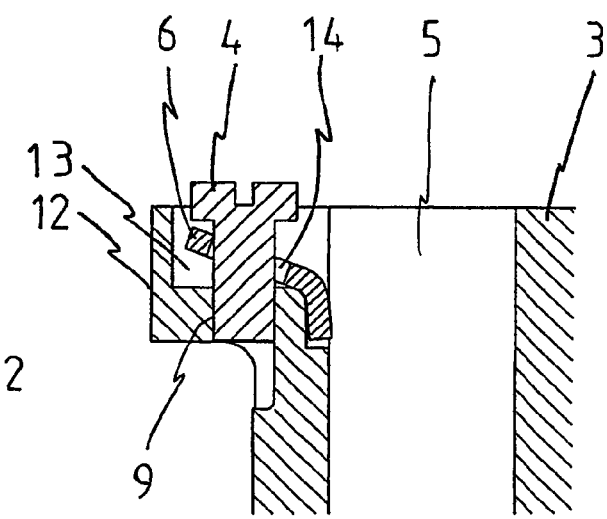
FIG. 2 is a cross-sectional view of the pipe shaft provided with a tightening piece.
Figure 3:
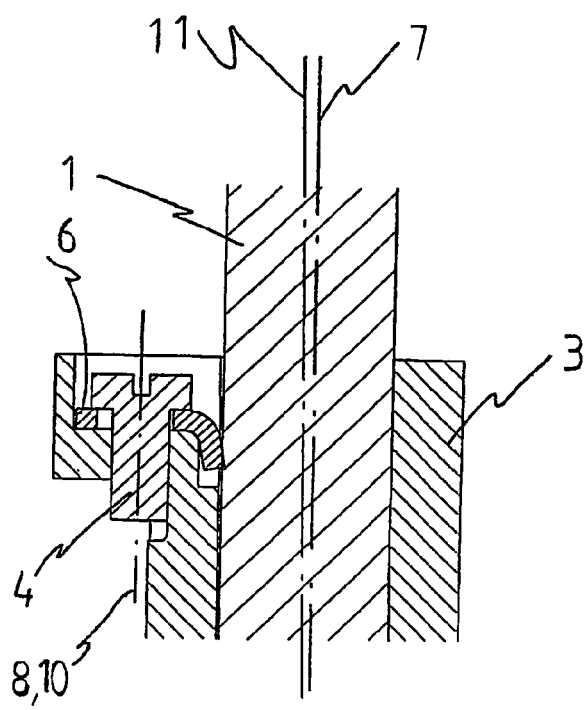
FIG. 3 is a cross-sectional view of the pipe shaft provided with a control shaft attached thereto.

FIG. 1 to 3 illustrate an arrangement for securing a control shaft 1 to a pipe shaft 3 of a switch 2. The control shaft 1 is mounted partly in the switch 2 pipe shaft 3 and tightened to the switch 2 pipe shaft 3 by a screw 4.

In FIG. 1, the pipe shaft 3 is provided with a hole 5 having a substantially square cross section. It is, however, obvious to a person skilled in the art that the hole 5 of the pipe shaft 3 may also have another cross-sectional shape.

The arrangement comprises a tightening piece 6. The screw is arranged to act on the control shaft 1 through the tightening piece 6 so that when the screw 4 is turned, i.e. tightened, the tightening piece 6 is arranged to press the control shaft 1 against the inner surface (not denoted by a reference number) of the pipe shaft 3 so that the control shaft 1 tightens fast between the tightening piece 6 and the inner surface of the pipe shaft.

In the figures, the tightening piece 6 is securable by a screw and tightenable to the pipe shaft 3 by the screw 4 so that the tightening piece 6 is arranged to press the control shaft 1 against the inner surface of the pipe shaft 3 when the screw 4 is tightened so that the control shaft 1 tightens fast between the tightening piece 6 and the inner surface of the pipe shaft 3. Since the tightening piece 6 is secured to the pipe shaft 3 by the screw 4, the actual tightening piece 6 stays well in place.

In FIG. 3, the control shaft 1 and the screw 4 are essentially parallel.

In FIG. 3, the control shaft 1 has a first middle axis 7 and the screw 4 has a second middle axis 8. In FIG. 3, the first middle axis 7 of the control shaft 1 and the second middle axis 8 of the screw 4 are substantially parallel. It is obvious to a person skilled in the art that one may alternatively deem that the control shaft 1 has a first -longitudinal axis and/or that the screw 4 has a second longitudinal axis.

In FIG. 3, the pipe shaft 3 is provided with a threaded hole 9 for the screw, the threaded hole having a third middle axis 10, and the pipe shaft 3 having a fourth middle axis 11. In FIG. 3, the third middle axis 10 of the threaded hole 9 and the fourth middle axis 11 of the pipe shaft 3 are substantially parallel. It is obvious to a person skilled in the art that one may alternatively deem that the threaded hole 9 has a third longitudinal axis and/or that the pipe shaft 3 has a fourth longitudinal axis.

In FIG. 3, the pipe shaft 3 also includes a projection 12, which is provided with a threaded hole 9. In the embodiment illustrated in the figures, the screw 4 preferably assumes a place immediately next to the pipe shaft 3 in the threaded hole 9 so that it is also parallel with the pipe shaft 3.

In the figures, the projection 12 is also provided with a cavity 13, which is arranged to prevent the tightening piece 6 from turning when the screw 4 is tightened.

The tightening piece 6 is preferably, but not necessarily, a spring steel piece, which tightens when the screw 4 is tightened and presses the control shaft 1 against the inner surface of the pipe shaft 3. In the figures, the tightening piece 6 is substantially an L-shaped spring steel piece. Alternatively, the tightening piece may be a J-shaped spring steel piece, for example.

In the figures, the tightening piece 6 comprises a through opening 14 for the screw 4.

It is obvious to a person skilled in the art that as the technology advances, the inventive concept can be implemented in various ways. The invention and its embodiments are thus not restricted to the above examples but they may vary within the scope of the claims.

The invention claimed is:

1. A switching device arranged for opening and closing a switch, the switching device comprising:
    a pipe shaft;
    a control shaft partly received in the pipe shaft and arranged to cooperate with the pipe shaft for transferring torque from the control shaft to the pipe shaft for opening and closing the switch;
    a tightening piece; and
    a screw arranged to act on the control shaft through the tightening piece so that in use, when the screw is turned, the tightening piece presses the control shaft radially against the pipe shaft so that the control shaft tightens fast between the tightening piece and the pipe shaft, wherein the pipe shaft comprises a threaded hole for the screw and the threaded hole has a center axis that coincides with a longitudinal axis of the threaded hole, the pipe shaft has a center axis that coincides with a rotational axis of the pipe shaft, and the center axis of the threaded hole and the center axis of the pipe shaft are substantially parallel;
    wherein the tightening piece is substantially an L-shaped or a J-shaped resilient piece.

2. A switching device according to claim 1, wherein
    the tightening piece is secured to the threaded hole of the pipe shaft by the screw, and
    the tightening piece is tightenable to the threaded hole of the pipe shaft by the screw so that the tightening piece presses the control shaft against the pipe shaft when the screw is tightened so that the control shaft tightens fast between the tightening piece and the pipe shaft.

3. A switching device according to claim 2, wherein
    the pipe shaft has a projection, and
    the threaded hole is in the projection.

4. A switching device according to claim 2, wherein
    the control shaft has a center axis,
    the screw has a center axis, and
    the center axis of the control shaft and the center axis of the screw are substantially parallel.

5. A switching device according to claim 2, wherein the tightening piece is a spring steel piece.

6. A switching device according to claim 1, wherein
    the pipe shaft has a projection, and
    the threaded hole is in the projection.

7. A switching device according to claim 6, wherein
    the projection is provided with a cavity, which is arranged to prevent the tightening piece from turning when the screw is tightened.

8. A switching device according to claim 6, wherein
    the control shaft has a center axis,
    the screw has a center axis, and
    the center axis of the control shaft and the center axis of the screw are substantially parallel.

9. A switching device according to claim 1, wherein
    the control shaft has a center axis,
    the screw has a center axis, and
    the center axis of the control shaft and the center axis of the screw are substantially parallel.

10. A switching device according to claim 1, wherein the tightening piece is a spring steel piece.

11. A switching device according to claim 1, wherein the tightening piece is a spring steel piece.

12. A switching device according to claim 1, wherein the tightening piece comprises a through opening for the screw.

13. A switchboard cabinet comprising:
    a switch;
    a door provided with a control handle or the like for controlling the switch in the switchboard cabinet;
    a switch pipe shaft mounted in the cabinet;
    a switch control shaft for transmitting a rotational motion of the control handle to the switch via the pipe shaft for turning the switch from one operational position to another, the switch control shaft partly received in the pipe shaft, the control shaft and the pipe shaft being adapted to co-operate with each other for transferring torque from the control shaft to the pipe shaft;
    a tightening piece; and
    a screw arranged to act on the control shaft through the tightening piece so that when the screw is turned, the tightening piece is arranged to press the control shaft radially against the pipe shaft so that the control shaft tightens fast between the tightening piece and the pipe shaft, wherein the pipe shaft comprises a threaded hole for the screw and the threaded hole has a center axis that coincides with a longitudinal axis of the threaded hole, the pipe shaft has a center axis that coincides with a rotational axis of the pipe shaft, and the center axis of the threaded hole and the center axis of the pipe shaft are substantially parallel;
    wherein the tightening piece is substantially an L-shaped or a J-shaped resilient piece.

14. A switchboard cabinet according to claim 13, wherein
    the pipe shaft has a projection, and
    the threaded hole is in the projection.

15. A switchboard cabinet according to claim 13, wherein
    the control shaft has a center axis,
    the screw has a center axis, and
    the center axis of the control shaft and the center axis of the screw are substantially parallel.

16. A switchboard cabinet according to claim 13, wherein the tightening piece is a spring steel piece.

17. A switchboard cabinet according to claim 13, wherein the control shaft extends between the control handle or the like in the switchboard cabinet and the switch pipe shaft when the door of the switchboard cabinet is closed.

18. A switching device according to claim 13, wherein the tightening piece comprises a through opening for the screw.

19. A securing apparatus for a switchboard cabinet including a switch, the apparatus comprising:
- a pipe shaft;
- a control shaft partly received in the pipe shaft and arranged to co-operate with the pipe shaft for transferring torque from the control shaft to the pipe shaft for controlling the switch;
- a tightening piece;
- a screw arranged to act on the control shaft through the tightening piece so that in use, when the screw is turned, the tightening piece presses the control shaft radially against the pipe shaft so that the control shaft tightens fast between the tightening piece and the pipe shaft, wherein the pipe shaft comprises a threaded hole for the screw, the threaded hole has a center axis, the pipe shaft has a center axis and the center axis of the threaded hole and the center axis of the pipe shaft are substantially parallel;
- wherein the tightening piece is substantially an L-shaped or a J-shaped resilient piece.

20. A securing apparatus for a switchboard cabinet according to claim 19, wherein the tightening piece is a spring steel piece.

21. A switching device according to claim 19, wherein the tightening piece comprises a through opening for the screw.

* * * * *